United States Patent [19]

Eames

[11] 3,962,513

[45] June 8, 1976

[54] LASER TRANSFER MEDIUM FOR IMAGING PRINTING PLATE

[75] Inventor: Arnold C. Eames, Westbrook, Maine

[73] Assignee: Scott Paper Company, Philadelphia, Pa.

[22] Filed: Mar. 28, 1974

[21] Appl. No.: 455,594

[52] U.S. Cl. ................................ 428/323; 96/27 R; 101/463; 101/470; 346/76 L; 427/53; 427/146; 427/407; 428/480; 428/481; 428/913

[51] Int. Cl.[2] .................... G03G 5/00; G01D 15/34; B41M 5/26

[58] Field of Search ............ 96/27 R; 101/463, 470, 101/462, 467; 346/76 L; 117/36.3, 36.1, 76 F, 93.3; 427/146, 53; 428/323, 480, 481, 913

[56] References Cited

UNITED STATES PATENTS

| | | | |
|---|---|---|---|
| 3,311,497 | 3/1967 | Park | 117/76 F X |
| 3,479,198 | 11/1969 | Barth | 117/76 F X |
| 3,489,597 | 1/1970 | Parker | 117/76 F X |
| 3,522,072 | 7/1970 | Florence et al. | 117/76 F X |
| 3,665,483 | 5/1972 | Becker et al. | 346/76 L X |
| 3,745,586 | 7/1973 | Braudy | 117/93.3 X |
| 3,787,210 | 1/1974 | Roberts | 117/36.1 X |
| 3,793,025 | 2/1974 | Vranken et al. | 101/463 X |

*Primary Examiner*—Ralph Husack
*Attorney, Agent, or Firm*—John A. Weygandt; John W. Kane

[57] ABSTRACT

A transfer film comprising a transparent substrate having thereon a coating comprising particles which absorb laser energy and a self-oxidizing binder is improved by overlying the coating with a layer of ink - receptive resin. Material is transferred by a laser beam from the transparent carrier film to a lithographic surface, thereby producing a planographic printing plate and a film having clear areas corresponding to the image on the plate.

1 Claim, 2 Drawing Figures

LASER TRANSFER MEDIUM FOR IMAGING PRINTING PLATE

BACKGROUND OF THE INVENTION

1. Field of the Invention

This invention relates to the recording of information on film and the simultaneous preparation of planographic printing plates.

DESCRIPTION OF THE PRIOR ART

Recently many systems for imaging printing plates with laser beams have been proposed. By and large the problems associated with manipulation of the laser beam have been overcome. There remains a need however for a rapid and efficient means for producing plates.

In addition it would be desirable to have a negative transparent master of the image produced by the laser beam. Such a negative could be used in the production of proof copies or for imaging additional printing plates.

In co-pending commonly assigned application Ser. No. 434,256 filed Jan. 17, 1974, a transparent film such as polyester film is coated with a formulation comprising a material which absorbs laser energy, such as carbon black particles and a self-oxidizing binder, such as nitrocellulose. To record on this lamination of film and coating, a beam of energy from a laser which produces wave lengths in the infrared region such as a YAG (yttrium-aluminum-garnet) laser which has an effective wave length of about 1.06 microns, or by an argon laser, which has an effective wave length in a range of from about 0.48 to about 0.52 micron, is focused by means known in the art through the transparent film to the interface between the coating and the film. The energy provided by the laser beam heats the self-oxidizing binder to initiate combustion. This combustion, or blow-off at this point carries with it the heat absorbing particles and the resin, leaving a clear area on the film.

If a conventional lithographic printing surface such as a sheet of aluminum is placed adjacent to the coating, irradiation with the laser causes the selected transfer of the coating on the film to the lithographic printing surface. The transferred portions of the coating, being ink-respective, become the image areas for the planographic plate.

While excellent printing plates and negative transparencies can be produced in accordance with the invention described in the aforementioned Ser. No. 434,256, the composition of the layer which is transferred presents an unfavorable trade-off situation. If said layer is made relatively thin in order to promote writing speed (the rate at which the laser can transfer material), then the run length of the resulting plate will not be great because only a relatively small amount of material will have been transferred. If said layer is made relatively thick in order to provide long run length, writing speed is reduced and the resulting images suffer from a certain amount of lack of definition or sharpness.

It is therefore an object of the present invention to improve the production of high quality printing plates by means of a laser beam.

SUMMARY OF THE INVENTION

In accordance with the present invention, the construction which comprises a film transparent to laser radiation having thereon a laser responsive coating, which comprises particles which absorb laser energy and a self-oxidizing binder, is improved by the application to said coating of a layer of ink-receptive (oleophilic) resin. When such a layer is utilized, irradiation with the laser results in the transfer of an image capable of long run length which has sharper definition than previously achievable. The thickness of the layer of ink-receptive resin is not critical. It is generally preferred that the thickness of this layer be several times that of the laser responsive coating but not so thick as not to be readily removed by the combustion or blow-off of the laser responsive layer. The adjustment of this relationship is within the skill of the ordinary worker in the art to which the present invention pertains.

While the mechanism by which sharper images are obtained in accordance with the present invention is not fully understood it is believed that the products of combustion or blow-off from the irradiated area of the laser responsive layer are absorbed in the portion of the ink-receptive layer which has been transferred to the lithographic surface, thereby limiting scattering or dispersal of such products, which would cause a diffuse image.

Figure 1:
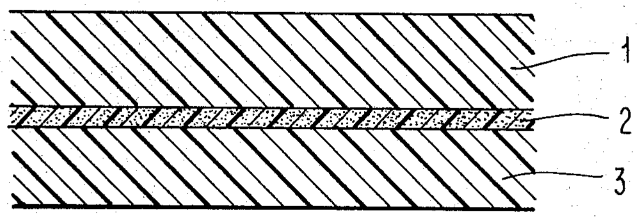
FIG. 1 is a cross-sectional view showing the construction of the article of the present invention.

Referring now to the drawings, FIG. 1 depicts the composite structure of the article of the invention. Substrate 1 is a sheet or film of material which is transparent to laser energy such as Mylar polyester. Laser responsive layer 2 comprises particles which absorb laser energy, such as carbon black and a self-oxidizing binder such as nitrocellulose. Ink-receptive layer 3 is applied directly to layer 2. The ink-receptive or oleophilic resin can be selected from any of those commonly used in the lithographic art. Illustrative of the ink receptive resins suitable for use in the present invention include phenol- and cresol-formaldehyde resins especially the Novolak resins, urea-formaldehyde resins, melamine-formaldehyde resins, vinyl resins, alkyd resins, polyester resins, polyacrylate including polymethacrylate and polyethylacrylate resins, polyamides (nylon), poly vinyl acetate, polyvinyl chloride, poly vinylidene chloride polystyrene, copolymers of styrene and butadiene, and polyalkylene especially polyethylene. Ink-receptive layer 3 may be applied by conventional coating techniques in the form of an aqueous latex or organic solvent solution. Alternatively, the resin may be applied by extruding it in the molten form, a technique commonly referred to as "hot melt" extrusion. In some cases, a film of resin such as polyethylene, polystyrene or polyvinyl acetate may be laminated to laser responsive layer 2.

Figure 2:
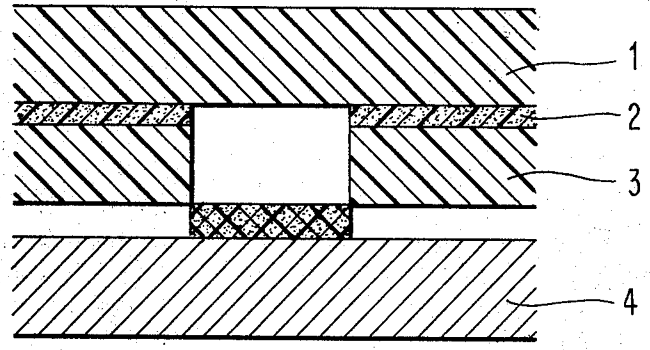
FIG. 2 is a cross-sectional view illustrating the formation of an image area on a lithographic surface using the article of the present invention.

In FIG. 2, laser radiation is shown transferring an area of the laser responsive layer 2 and the ink-receptive layer 3 to a lithographic surface 4 which may be any material conventionally employed for this purpose, for example, aluminum. For purposes of illustration, a space or gap is shown between layers 3 and 4. In practice it is sought to maintain these layers in as close a contact as possible during the imaging step.

DESCRIPTION OF THE PREFERRED EMBODIMENT

Means for modulating a laser beam to record information on a substrate are well known in the art and need not be discussed here. In general they can be characterized as scanning mechanisms which cause the beam to traverse the area, delivering energy in a predetermined manner. Suitable apparatus is described in U.S. Pat. No. 3,739,088 granted June 12, 1973.

EXAMPLE 1

The following laser responsive coating was applied onto a 3 mil thick Mylar polyester film:

| | Parts by Weight |
|---|---|
| Carbon | 2 |
| Nitrocellulose | 1 |

Methyl ethyl ketone in an amount sufficient to adjust total solids content to 25% by weight.

The coating was applied using a No. 6 mayer rod at a rate to provide a dry coating weight of 0.2 pound per ream (3300 sq. ft.).

Over this laser responsive layer was applied a layer of a Novolak (cresol-formaldehyde) resin dissolved in methyl ethyl ketone at 20% by weight solids. The coating was applied using a No. 6 mayer rod at a rate to provide a dry coating weight of 0.8 pound per ream.

The coated film surface was placed in intimate contact with the surface of a 5 mil sheet of aluminum foil. A YAG laser was directed through the transparent polyester film from its uncoated surface to record the information to be printed. As the film was selectively irradiated by the modulated beam, the coating in the area struck by the beam was transferred from the film to the adjacent aluminum surface. Images of excellent outline and definitions were transferred. Thereafter the plate was mounted on a conventional lithographic printing press where approximately 1,000 satisfactory copies were printed before the plate showed appreciable signs of wear.

While the invention has been particularly described with reference to preferred embodiments thereof, it is understood that various other changes and modifications thereof will occur to a person skilled in the art without departing from the spirit and scope of the invention as defined by the appended claim.

What is claimed is:

1. In a transfer film for use in making an imaged printing plate by directing laser energy through a transparent substrate having thereon a coating comprising particles which absorb said laser energy and a self-oxidizing binder, the improvement which comprises a layer of ink-receptive resin overlying said coating.

* * * * *